Figure 1:
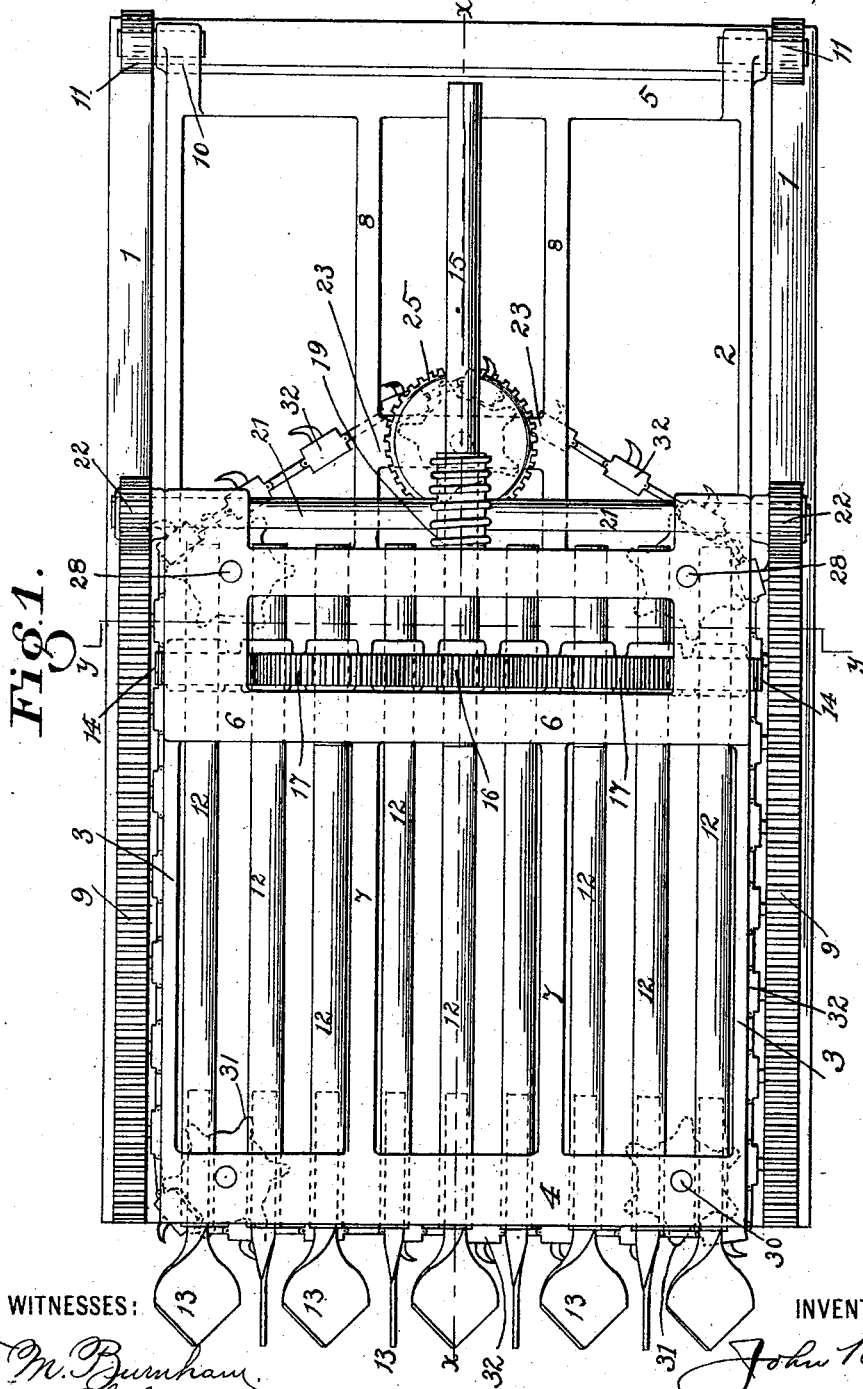

(No Model.) 2 Sheets—Sheet 1.

J. BLAIR.
MINING MACHINE.

No. 591,449. Patented Oct. 12, 1897.

WITNESSES:
F. M. Burnham
A. L. Phelps

INVENTOR
John Blair
BY
C. C. Shepherd
ATTORNEY (No Model.) 2 Sheets—Sheet 2.
J. BLAIR.
MINING MACHINE.
No. 591,449. Patented Oct. 12, 1897.
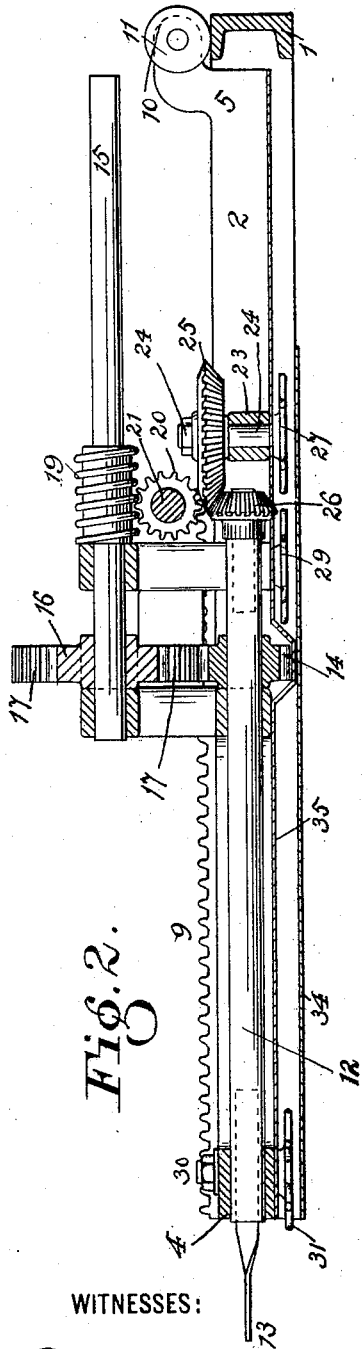
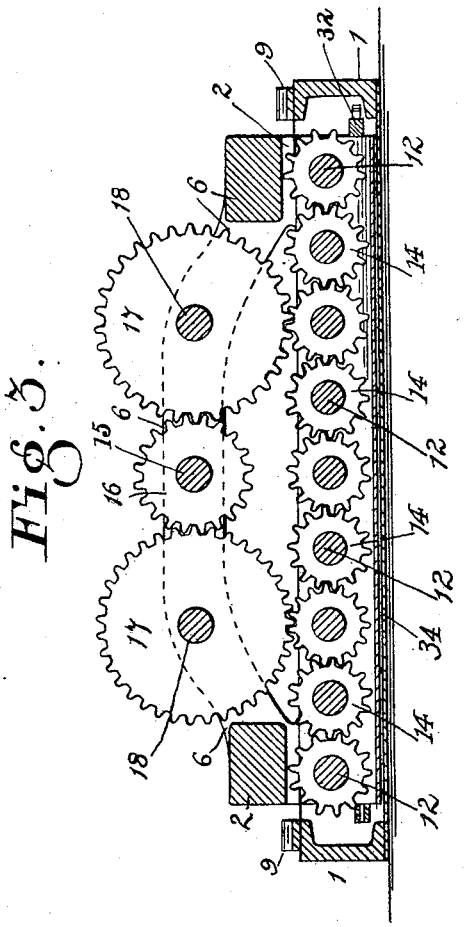
WITNESSES:
F. M. Burnham.
A. L. Phelps
INVENTOR
John Blair
BY
C. C. Shepherd
ATTORNEY

UNITED STATES PATENT OFFICE.

JOHN BLAIR, OF NEWARK, OHIO.

MINING-MACHINE.

SPECIFICATION forming part of Letters Patent No. 591,449, dated October 12, 1897.

Application filed January 20, 1897. Serial No. 619,995. (No model.)

*To all whom it may concern:*

Be it known that I, JOHN BLAIR, a citizen of the United States, residing at Newark, in the county of Licking and State of Ohio, have invented a certain new and useful Improvement in Mining-Machines, of which the following is a specification.

My invention relates to the improvement of mining-machines of that class which are adapted for mining coal and similar substances.

The objects of my invention are to provide a mining-machine of superior construction and arrangement of parts; to so construct the same as to provide for the rapid and effective production of a kerf in a coal wall; to combine and operate in conjunction one with the other an endless cutting-tool-carrying chain and a series of drills; to provide improved means for operating a mining-machine, and to produce other improvements, the details of which will be more fully pointed out hereinafter. These objects I accomplish in the manner illustrated in the accompanying drawings, in which—

Figure 1 is a plan view of my improved mining-machine. Fig. 2 is a central longitudinal section of the same, taken on line $xx$ of Fig. 1; and Fig. 3 is a transverse section on line $yy$ of Fig. 1.

Similar numerals refer to similar parts throughout the several views.

In the construction of my improved machine I employ a substantially U-shaped external frame 1, and within this frame 1 I provide a traveling oblong frame 2, of which 3 represents the longer parallel sides and 4 and 5 represent, respectively, the front and rear ends.

About midway the length of the traveling frame 2 I provide transverse parallel bridge arms or arches 6, which are preferably formed integral with said traveling frame. These bridge-arms are connected at intervals with the front and rear ends of the traveling frame by means of frame-arms 7 and 8.

Upon each of the longer arms of the external frame 1 I provide a rack-bar 9, the latter extending from the front end of said frame-arm to a point near the center of the length thereof. The rear end portion of the traveling frame 2 is provided, as indicated at 10, with two arm extensions, each of which carries a roller 11, said rollers bearing, respectively, on the upper sides of the parallel side arms of the frame 1.

12 represents parallel drill-rods, which have their rear end portions passing through and journaled within the bridge portions 6 of the traveling frame and which have their forward end portions journaled in the transverse forward end bar 4 of said traveling frame. Each of these drill-rods has detachably supported in its outer end a drill 13.

Upon the inner end portion of each of the drill-shafts 12 is carried a gear-wheel 14, these gear-wheels 14 meshing with each other.

15 represents a driving-shaft which extends rearwardly from the central portion of the bridge 6, in which it is journaled. This driving-shaft carries between said bridge-arms a gear-wheel 16, which, as indicated in the drawings, has a gear connection on opposite sides with the larger gear-wheels 17, the shafts 18 of which are mounted in said bridge-arms. Each of these larger gear-wheels 17 gears on its under side with one of the drill-shaft gear-wheels 14.

Upon the driving-shaft 15 and in rear of the bridge-frame I provide a worm 19, which, as shown in the drawings, gears with a worm-wheel 20, mounted on a transverse shaft 21, said shaft 21 being journaled in rear extensions of the frame-bridge. Upon each end of said shaft 21 is mounted a pinion-wheel 22, said pinion-wheels 22 bearing upon and engaging with the teeth of the racks 9 of the stationary frame.

Journaled in the frame-bar 23, which extends between the frame-arms 8, is a vertical shaft 24, upon the upper end portion of which is mounted a bevel gear-wheel 25. This bevel-wheel 25 gears with a bevel-pinion 26, which is on the rear end of the central drill-shaft 12.

Upon the lower end of the shaft 24 is mounted a sprocket-wheel 27. Mounted on the lower ends of vertical shafts 28, which are supported in the ends of the frame-bridge portions, are sprocket-wheels 29. Upon the lower end portions of vertical shafts 30, which are supported near each end of the forward frame-bar 4, are mounted sprocket-wheels 31.

32 represents an endless cutting-tool-carrying chain, which passes about the sprocket-wheels 31, 29, and 27. The forward and transverse portion of this cutter-chain travels in a plane which is below the shanks of the drills 13, while the spaces between the sides of the frames 1 and 2 afford passages for the forwardly and rearwardly moving arms of said chain.

As indicated in the drawings, the arms of the frame 1 are on a lower plane than those of the traveling frame 2, and the said frames are preferably provided on their under sides with bottom plates, which are indicated at 34 and 35.

In utilizing my device a motor or other source of power is adapted to be supported upon the rear portion of the traveling frame, and through a suitable gear or belt connection rotary motion is imparted therefrom to the driving-shaft 15. The rotation of this shaft through the connection of the worm 19 and wheel 20 results in a rotation of the shaft 21, and through the engagement of the pinions 22 with the racks 9 said sliding frame is driven forward or backward upon said stationary frame. The rotation of the shaft 15 also imparts through the gear-wheel 16 a rotary motion to the wheels 17, and the latter, through their engagement with two of the wheels 14 and the engagement of the latter with each other, impart a rotary motion to the drill-shafts.

It will be observed that the gear connection of the wheels above mentioned is such as to result in adjoining wheels of the series 14 being rotated in opposite directions and in a similar rotation of the drills.

A traveling motion is imparted to the cutter-chain through the gear connection of the central drill-shaft and the sprocket-wheel-carrying shaft 24.

In operation it will be seen that the rotating drills will, through the forward movement of the traveling frame, be fed into the coal wall, resulting in the production of a partially-completed kerf, which kerf will be fully completed by the action of the chain-cutters when the sliding frame has been fed forward sufficiently to bring said cutters into contact with the coal which may remain within the kerf.

By the operation described it will be seen that the combined action of the rotating drills and the chain-cutters must result in the formation of a complete kerf in the coal wall, which will admit of the entrance therein of the traveling frame.

The construction of the machine herein described is such as to support the cutting-chain adjacent to the mine-floor, thus admitting of the employment of the drills in connection with what is ordinarily termed an "undercutting machine" and adapting the machine for use in their veins.

I am aware that endless-chain cutting mining-machines have been employed heretofore; also that various forms of drill-machines have been used, but by the construction herein shown and described a reliable and effective combination of a drilling and chain cutting machine is effected, which may be produced in a durable and reliable form at a comparatively low cost of manufacture.

Having now fully described my invention, what I claim, and desire to secure by Letters Patent, is—

1. In a mining-machine the combination with a traveling frame, means for feeding said frame forward and backward and an endless tool-carrying chain movably mounted in said frame, of a series of drill-carrying shafts rotatably mounted in said frame at intervals between the side bars thereof and adapted to operate in conjunction with said chain cutters to produce a kerf, substantially as and for the purpose specified.

2. In a mining-machine the combination with an external frame, a traveling frame mounted thereon and an endless cutter-chain movably mounted in said traveling frame and running across the front of the latter, of a series of drill-shafts journaled in said traveling frame at intervals between the side bars thereof, detachable drills projecting from said shafts at the front of said machine and means for imparting a backward or forward movement to said sliding frame, a rotary movement to said drill-shafts and a traveling movement to said chain, substantially as and for the purpose specified.

JOHN BLAIR.

In presence of—
C. C. SHEPHERD,
E. W. BUNKER.